Sept. 5, 1950 W. H. IVEY 2,521,221
CARRIER FOR DESERT WATER BAGS
Filed May 21, 1948

INVENTOR.
WILLARD H. IVEY.
BY
ATTORNEY.

Patented Sept. 5, 1950

2,521,221

UNITED STATES PATENT OFFICE 2,521,221

CARRIER FOR DESERT WATER BAGS

Willard H. Ivey, Long Beach, Calif.

Application May 21, 1948, Serial No. 28,470

2 Claims. (Cl. 224—42.03)

This invention relates to a carrier for desert water bags so that a bag of this character can be carried on an automobile without injuring the finish or paint of the vehicle.

An object of my invention is to provide a novel carrier for desert water bags which can be supported on the vehicle bumper, or on bumper guards, and will support the water bag so that the bag rests against the bumper, thus preventing the bag from rubbing against painted parts of the vehicle, and also will not interfere with the flow of air to the radiator, as is the case with some carriers heretofore in use.

Another object of my invention is to provide a novel carrier of the character stated, which is simple in construction and can be quickly and easily mounted on a modern automobile.

Other objects, advantages and features of invention may appear from the accompanying drawing, the subjoined detailed description, and the appended claims.

Figures 1, 2:
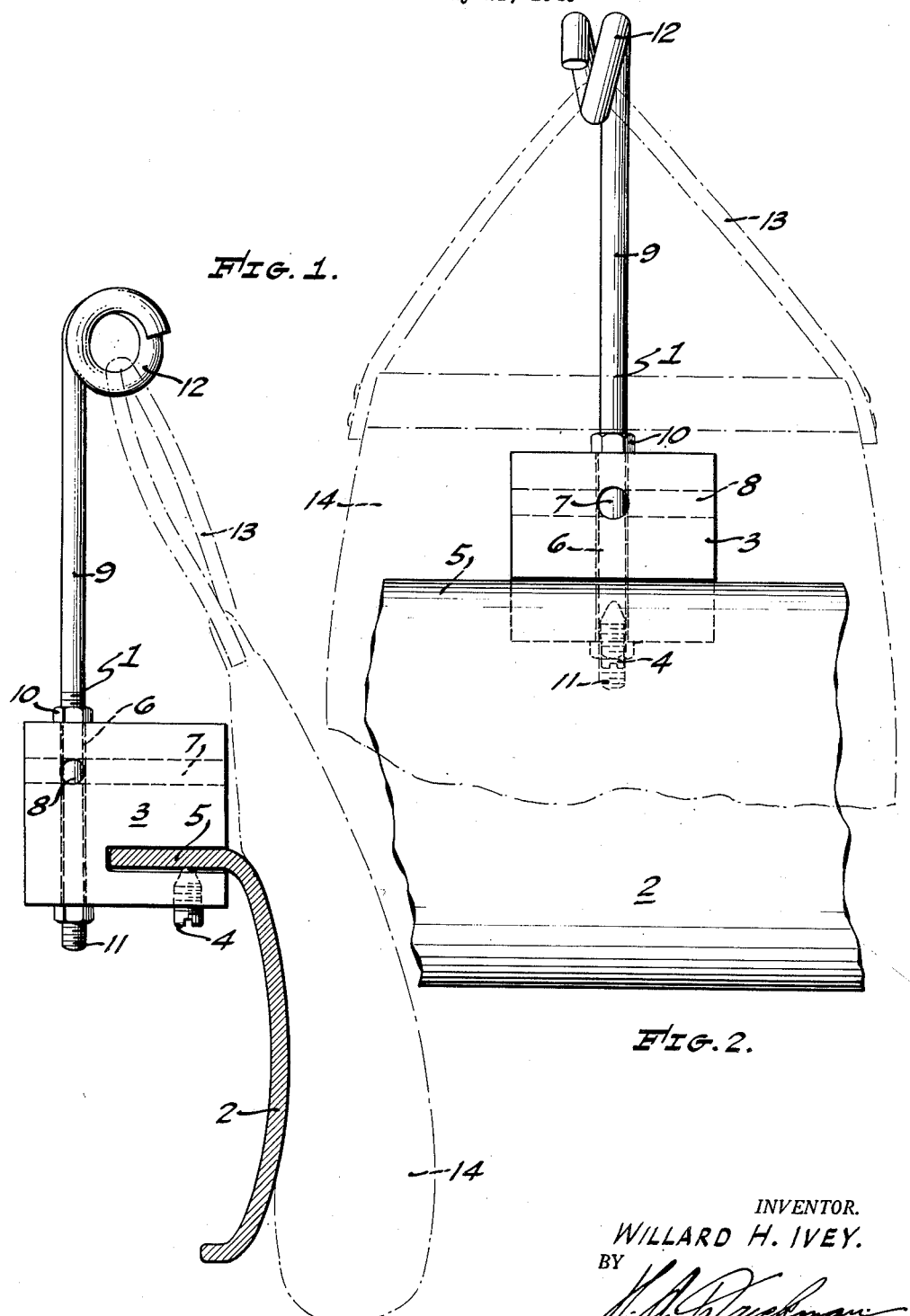
Figure 1 is a side elevation of my carrier in position on a vehicle bumper.
Figure 2 is a front elevation of the same.

Referring more particularly to the drawing, travelers find it necessary to carry desert water bags on occasion, and heretofore these bags have been supported from the handles of the vehicle, or from various projections around the front of the vehicle so that the water bag would hang either against the painted body, or against the radiator or radiator grille. In one instance the paint would be rubbed off of the vehicle, and in the other instance, air to the radiator would be interfered with.

My carrier 1, is attached to the vehicle bumper 2, either at the front or rear of the vehicle, or it may be attached to a bumper guard which rises from the bumper 2, this latter arrangement not being shown however, it will be obvious. A block 3, is substantially secured to the bumper 2, by means of the set screw 4, which bears against the bumper 2, and preferably against the upper horizontal portion 5, of the bumper. The block 3, is provided with three bores 6, 7, and 8, each of these bores being arranged in a different plane so that the supporting post 9, can always be arranged vertically. The post 9, can be fitted into any one of the bores, 6, 7, or 8, depending on the position of the block 3, on the particular bumper or bumper guard. The post 9, may be secured to the block 3, by means of the nuts 10 and 11, which screw onto the post and bear against the block. A coil hook 12, is formed on the upper end of the post 9, and this hook receives the rope handle 13, of the desert bag 14.

From examination of Figure 1, it will be evident that the water bag will rest against the bumper 2, and will thus not injure the finish of the vehicle. The fact that the post 9, is removable enables this post to be adjusted in the block 3, so that it will always be in a vertical position to properly support the water bag.

Having described my invention, I claim:

1. A carrier for desert water bags, comprising a block, said block having a groove therein to receive a supporting element, a set screw threaded onto the block and extending into said groove, a post, a hook on the post to receive the handle of a desert water bag, said block having a bore extending therethrough, said post being fitted in said bore, and a nut threaded on the post and bearing against the block.

2. A carrier for desert water bags, comprising a block, said block having a groove therein to receive a supporting element of a vehicle, a set screw threaded into the block and extending into said groove, said block having a plurality of bores therein, each of said bores being in a different plane, a post adapted to fit in any one of said bores, a nut threaded on the post and bearing against the block to hold the post rigidly in the block, and a hook on the post adapted to receive the handle of a desert water bag.

WILLARD H. IVEY.

REFERENCES CITED

The following references are of record in the file of this patent:

UNITED STATES PATENTS

| Number | Name | Date |
|---|---|---|
| 1,597,266 | Dearman | Aug. 24, 1926 |
| 1,689,436 | Hodge | Oct. 30, 1928 |
| 2,174,609 | Waage | Oct. 3, 1939 |
| 2,238,258 | Flocker | Apr. 15, 1941 |
| 2,447,771 | Rogers | Aug. 24, 1948 |